(12) United States Patent
McCleery

(10) Patent No.: US 11,548,251 B2
(45) Date of Patent: Jan. 10, 2023

(54) EXPANDABLE BELT AND TREAD DRUM WITH REVERSE OFFSET FINGERS

(71) Applicant: Davian Enterprises, LLC, Greenback, TN (US)

(72) Inventor: Kenneth L. McCleery, Loudon, TN (US)

( * ) Notice: Subject to any disclaimer, the term of this patent is extended or adjusted under 35 U.S.C. 154(b) by 77 days.

(21) Appl. No.: 16/774,943

(22) Filed: Jan. 28, 2020

(65) Prior Publication Data

US 2020/0238647 A1   Jul. 30, 2020

Related U.S. Application Data

(60) Provisional application No. 62/797,758, filed on Jan. 28, 2019.

(51) Int. Cl.
*B29D 30/24* (2006.01)
*B29D 30/26* (2006.01)

(52) U.S. Cl.
CPC ......... *B29D 30/245* (2013.01); *B29D 30/242* (2013.01); *B29D 2030/2657* (2013.01)

(58) Field of Classification Search
CPC ........ B29D 30/12; B29D 30/24; B29D 30/26; B29D 2030/265; B29D 2030/2657; B29D 30/242
See application file for complete search history.

(56) References Cited

U.S. PATENT DOCUMENTS

| 1,233,567 A | 7/1917 | Furry |
| 1,750,728 A | 3/1930 | Robison |
| 2,073,729 A | 3/1937 | Bostwick |
| 2,168,897 A | 8/1939 | Bostwick |

(Continued)

FOREIGN PATENT DOCUMENTS

| CA | 2142004 | 8/1995 |
| CA | 2188639 | 4/1997 |

(Continued)

OTHER PUBLICATIONS

Patent Cooperation Treaty, Int'l Search Report & Written Opinion, Form PCT/ISA/220 (Revised Jan. 2020) dated May 7, 2020.

(Continued)

*Primary Examiner* — Geoffrey L Knable
(74) *Attorney, Agent, or Firm* — Blanchard Horton PLLC

(57) ABSTRACT

An assembly defining a portion of an arcuate outer surface of a tire building drum, the assembly including first and second interlacing deck segments coupled to a central support member to be moved in a radially reciprocating manner, each of the interlacing deck segments including a plurality of center sections coupled together, a plurality of first grooves between the center sections, a plurality of first finger portions extending from the center sections away from the central support member, a plurality of second finger portions extending from the center sections in an opposite direction over the central support member, and a plurality of second grooves formed adjacent each of the second finger portions, wherein the second finger portions are arranged in parallel over the central support member, and the first grooves in each of the interlacing deck segments align with the second grooves of the other of the interlacing deck segments.

12 Claims, 13 Drawing Sheets

(56) References Cited

U.S. PATENT DOCUMENTS

| | | |
|---|---|---|
| 2,201,469 A | 5/1940 | Bostwick |
| RE22,369 E | 8/1943 | Bostwick |
| 2,335,169 A | 11/1943 | Bostwick |
| 2,353,767 A | 7/1944 | Schnedarek |
| 2,367,831 A | 1/1945 | Manson |
| 2,529,861 A | 11/1950 | Angell et al. |
| 2,614,057 A | 10/1952 | Ericson et al. |
| 2,699,198 A | 1/1955 | Balzhiser |
| 2,715,932 A | 8/1955 | Frazier |
| 2,728,616 A | 12/1955 | Potter |
| 3,077,918 A | 2/1963 | Noall |
| 3,101,289 A | 8/1963 | Giletta et al. |
| 3,111,444 A | 11/1963 | Pouilloux |
| 3,111,445 A | 11/1963 | Pouilloux et al. |
| 3,140,216 A | 7/1964 | Shifts et al. |
| 3,207,648 A | 9/1965 | Shuts |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Caretta |
| 3,607,558 A | 9/1971 | Nebout |
| 3,616,059 A * | 10/1971 | Frazier ............... B29D 30/245 156/400 |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,833,444 A | 9/1974 | Mallory |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,932,256 A | 1/1976 | Touchette |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,128,450 A | 12/1978 | Cantarutti |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,190,482 A | 2/1980 | Yabe |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Abbleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,547,251 A | 10/1985 | Landsness |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergel et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,500,074 A | 3/1996 | Suzuki |
| 5,505,803 A | 4/1996 | Byerley |
| 5,558,733 A | 9/1996 | Byerley |
| 5,618,374 A | 4/1997 | Byerley |
| 5,634,745 A | 6/1997 | Wiman et al. |
| 5,635,016 A | 6/1997 | Byerley |
| 5,650,034 A | 7/1997 | Siegenthaler |
| 5,709,768 A | 1/1998 | Byerley |
| 5,735,995 A | 4/1998 | Bull et al. |
| 5,755,922 A | 5/1998 | Baldoni et al. |
| 5,766,408 A | 6/1998 | Ogawa |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,336,485 B1 | 1/2002 | Kaneko et al. |
| 6,390,166 B1 | 5/2002 | Roberts et al. |
| 6,457,505 B1 | 10/2002 | Byerley |
| 6,475,319 B1 | 11/2002 | Akiyama |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,370,897 B2 | 5/2008 | Fukazawa |
| 7,637,665 B2 | 12/2009 | Cook |
| 7,699,952 B2 | 4/2010 | Linne et al. |
| 7,837,816 B2 | 11/2010 | Linne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 8,602,078 B2 | 12/2013 | Byerley |
| 8,701,731 B2 | 4/2014 | Roberts et al. |
| 9,044,908 B2 | 6/2015 | Babin |
| 9,427,925 B2 | 8/2016 | Araki |
| 10,189,221 B2 | 1/2019 | Jones et al. |
| 2003/0056874 A1 | 3/2003 | Durand |
| 2003/0168144 A1 | 9/2003 | Weaver et al. |
| 2003/0197389 A1 | 10/2003 | Moilanen et al. |
| 2004/0239134 A1 | 12/2004 | Fukazawa |
| 2006/0000554 A1 | 1/2006 | Kitz et al. |
| 2008/0017298 A1* | 1/2008 | Iyanagi ............... B29D 30/245 156/131 |
| 2008/0202690 A1 | 8/2008 | Painter |
| 2009/0151873 A1 | 6/2009 | Pinto et al. |
| 2010/0000658 A1 | 1/2010 | Roberts et al. |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0090787 A1 | 4/2012 | Jones et al. |

(56) References Cited

U.S. PATENT DOCUMENTS

| | | |
|---|---|---|
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |
| 2013/0168023 A1 | 7/2013 | Babin |
| 2014/0048212 A1 | 2/2014 | Weaver et al. |
| 2014/0116601 A1 | 5/2014 | Bormann |
| 2014/0213330 A1 | 7/2014 | Oh |
| 2014/0360673 A1 | 12/2014 | Marcus, Jr. |
| 2015/0028147 A1 | 1/2015 | Rich |
| 2015/0239190 A1 | 8/2015 | Currie et al. |
| 2016/0159023 A1 | 6/2016 | Delorme et al. |
| 2016/0176138 A1 | 6/2016 | Guzman |
| 2020/0101682 A1 | 4/2020 | Hassell et al. |

FOREIGN PATENT DOCUMENTS

| | | |
|---|---|---|
| CA | 2219387 | 4/1998 |
| DE | 2705504 A1 | 8/1978 |
| DE | 19913241 | 9/2000 |
| DE | 102009025759 | 11/2010 |
| EP | 1621327 | 2/2006 |
| EP | 1688240 | 8/2006 |
| EP | 1724099 A1 | 11/2006 |
| EP | 2008798 A1 | 12/2008 |
| EP | 2155481 | 2/2010 |
| EP | 2504159 | 10/2012 |
| GB | 2323573 A | 9/1998 |
| JP | 58179633 A | 10/1983 |
| JP | 57154323 | 3/1984 |
| JP | S60196330 | 10/1985 |
| JP | 2007136935 | 6/2007 |
| JP | 2008221750 A | 9/2008 |
| JP | 2009274392 | 11/2009 |
| JP | 2011255768 A | 12/2011 |
| JP | 2013018274 A | 1/2013 |
| JP | 5562470 B1 | 7/2014 |
| KR | 100963503 B1 | 6/2010 |
| MX | 200554 | 1/2001 |
| NL | 9401271 A | 3/1995 |
| RU | 2381899 | 2/2010 |
| SU | 1106682 | 8/1984 |
| WO | WO2001/007242 | 2/2001 |
| WO | WO2006/003058 | 1/2006 |
| WO | WO2008/025598 | 3/2008 |
| WO | WO2009/058296 | 5/2009 |
| WO | WO2010/052103 | 5/2010 |
| WO | WO2011/159343 | 12/2011 |
| WO | WO2012/021160 | 2/2012 |
| WO | WO2012/031193 | 3/2012 |

OTHER PUBLICATIONS

Kim, Harry, "International Search Report and Written Opinion", in PCT/US2021/028566, dated Aug. 30, 2021.

"International Search Report and the written opinion received for PCT Patent Application No. PCT/US2019/053428, dated Jan. 17, 2020", 4 Pages.

* cited by examiner

EXPANDABLE BELT AND TREAD DRUM WITH REVERSE OFFSET FINGERS

CROSS-REFERENCE TO RELATED APPLICATIONS

This application claims the benefit of U.S. Provisional Patent Application Ser. No. 62/797,758, filed on Jan. 28, 2019, which is incorporated herein in its entirety by reference.

FIELD OF INVENTION

The present general inventive concept relates to a radially expandable and contractible deck surface of the type used in tire building drums and other devices, and, more particularly, to a radially expandable and contractible deck surface having reverse offset fingers.

BACKGROUND

The manufacture of a vehicle tire commonly includes the steps of forming a tire carcass, forming a toroid-shaped belt and tread "package" of the tire separately from the carcass, and thereafter marrying the belt and tread package to the tire carcass to form a "green" tire. The green tire is thereafter treated to form the tread and various other features of a finished tire. Other supplementary steps, such as bonding the belt and tread package to the tire carcass (often referred to as "stitching" the belt and tread package), may be performed during the course of, or following, one or more of the aforementioned steps.

The formation of a tire carcass is typically performed using a tire building drum, of the type described in U.S. Pat. No. 6,457,505. Such a tire building drum typically defines a radially expandable and contractible cylindrical working surface upon which a tire carcass is formed. Subsequent to the formation of the tire carcass on the cylindrical working surface, such tire carcass may be transferred to an expansion drum, of the type discussed in U.S. Pat. No. 6,602,372. The tire carcass is positioned surrounding the expansion drum, and a portion of the tire carcass is overlaid with the belt and tread package. The tire carcass is then inflated to a toroid shape resembling, though often not identical to, the shape of a finished tire. While the tire carcass is inflated, the belt and tread package is joined to the tire carcass.

Formation of a belt and tread package of a tire is typically accomplished using a belt and tread drum, of the type disclosed in U.S. Pat. No. 6,013,147. Such a belt and tread drum typically has an outer cylindrical surface, or circumference, comprising a plurality of elongated segments, about which one or more layers of the tire belt material (comprising, for example, reinforcement cords embedded in a polymeric binder) are laid to define the belt and tread package. The circumference of the belt and tread drum is preferably capable of expanding and contracting to allow, for example, removal of a completed belt and tread package from the drum. A completed belt and tread package is typically essentially non-expandable radially. However, a completed belt and tread package is typically flexible to the extent that, when unsupported, the toroid-shaped belt and tread package will deform and sag under the influence of gravity. Also, desirably, the adjustable circumference of the belt and tread drum enables a single drum to be used to form belt and tread packages of alternative diameters.

During formation of the belt and tread package on the belt and tread drum, it is not uncommon for the belt and tread drum and accompanying tooling to be configured such that the elongated segments of the belt and tread drum apply considerable pressure to interior surfaces of the belt and tread package, in part to assist in maintaining a uniform toroid shape of the tire component during formation. Such high pressures applied to the interior surfaces of the tire component can result in at least a portion of the arced exterior surfaces of the elongated segments becoming at least partially imprinted in the tire component, resulting in the formation of very slight imprints of the arcuate exterior surfaces of the elongated segments, and corresponding very slight bulges adjacent the imprints, in the tire component. Further, it is known that the radius of curvature of the various arcuate segments forming the belt and tread drum's outer cylindrical surface is fixed by the rigidity of the segments, thus rendering it impossible for the segments to be moved between radially expanded and contracted positions and collectively provide perfectly-formed cylindrical surfaces at each of these two positions. If, for example, the circumference of the drum is adjusted to a size at which the segments are positioned at a distance from the longitudinal axis which exceeds the radius of curvature of each segment arc, there will exist regions about the drum circumference where the circumferentially outward edges of the segments curve slightly radially inwardly from the central portions of the segments. Conversely, if the circumference of the drum is adjusted to a size at which the segments are positioned at a distance from the longitudinal axis less than the radius of curvature of each segment arc, there will exist regions about the drum circumference where the circumferentially outward edges of the segments project slightly radially outwardly from the central portions of the segments. In either case, the outer circumference of the belt and tread drum will be very slightly out of round. If these out of round regions are large enough (as may occur, for example, when the drum is expanded to allow manufacture of a tire of relatively large diameter), it is possible that the drum may produce undesirable alternating imprints and bulges of the slightly out-of-round exterior surface of the tire building drum on a tire constructed with the drum. Such imprints and bulges are undesirable in that they may later manifest as irregularities in a finished tire, which may, in certain circumstances, produce undesirable effects, such as for example vibration, noise, and/or resonance of the rolling tire.

Early drums for constructing belt breaker and/or tread packages, which may be referred to herein as BT drums, featured parallel segments commonly wrapped with a sleeve or utilizing gap shields. The diameter range of those BT drums was limited, radial run-out (deviation) was severe, and multiple deck segments were typically needed or used. To combat the problem of gaps between the segments when expanding the drum to its maximum diameter, segments were formed with interlacing finger segments extending between the segments to provide at least partial support when the drum is expanded. Such finger segments improved the overall package support, largely eliminated the need for sleeves, and reduced run-out, but the expansion range of the drum was still limited in that the finger segments would no longer interface in larger diameter positions, creating areas without support for the BT package. A dual deck BT drum extended the diameter range with relatively quick segment change-outs, which reduced run-out to some extent, but also required the storage of segments that were not in use, which greatly reduces convenience. A later developed high range BT drum extended the range by using telescoping linear rails, allowing a diameter expansion ratio of approximately 1.7:1.

Thus, in light of the above, an improved segment for a belt and tread drum which includes features for limiting deviation from the general cylindrical shape of the drum throughout expansion and contraction of the drum, thereby limiting the development of vibration, noise, and/or resonance of a tire manufactured using the belt and tread drum, is desired. An improved segment that allows larger expansion ratios while also limiting such deviations is also desired.

BRIEF SUMMARY

According to various example embodiments of the present general inventive concept, a tire drum is provided with interlacing deck segments configured such that finger portions of the deck segments interlace and overlap a central support member, providing an increased deck support surface an expanded state of the tire drum.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing an assembly defining a portion of an arcuate outer circumferential working surface of a tire building drum, the assembly including first and second interlacing deck segments coupled to a central support member that is configured to be moved in a radially reciprocating manner from a longitudinal axis of the tire building drum, wherein each of the first and second interlacing deck segments includes a plurality of center sections coupled together proximate a lower surface thereof, a plurality of first grooves respectively formed between the center sections, a plurality of first finger portions extending respectively from the center sections away from the central support member, a plurality of second finger portions extending respectively from the center sections in an opposite direction from the first set of fingers and over the central support member, and a plurality of second grooves formed adjacent each of the respective second finger portions, wherein the second finger portions from each of the first and second interlacing deck segments are arranged in a substantially parallel formation over the central support member, and wherein the first grooves in each of the first and second interlacing deck segments respectively align with the second grooves of the other of the first and second interlacing deck segments.

The foregoing and/or other aspects and advantages of the present general inventive concept may also be achieved by providing an assembly defining a portion of an arcuate outer circumferential working surface of a tire building drum, the assembly including a central support member, a first interlacing deck segment coupled to the central support member, and configured with a first plurality of finger portions extending in a first circumferential direction away from the central support member, a second interlacing deck segment coupled to the central support member, and configured with a second plurality of finger portions extending in a second circumferential direction away from the central support member and opposite to the first circumferential direction, and a plurality of parallel grooves formed over the central support member proximate end portions of the first and second interlacing deck segments opposite distal ends of the finger portions, wherein first and second interlacing deck segments are configured such that finger portions extending from adjacent central support members are received in an parallel and interlaced configuration covering the central support member when the tire building drum is in a collapsed state.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
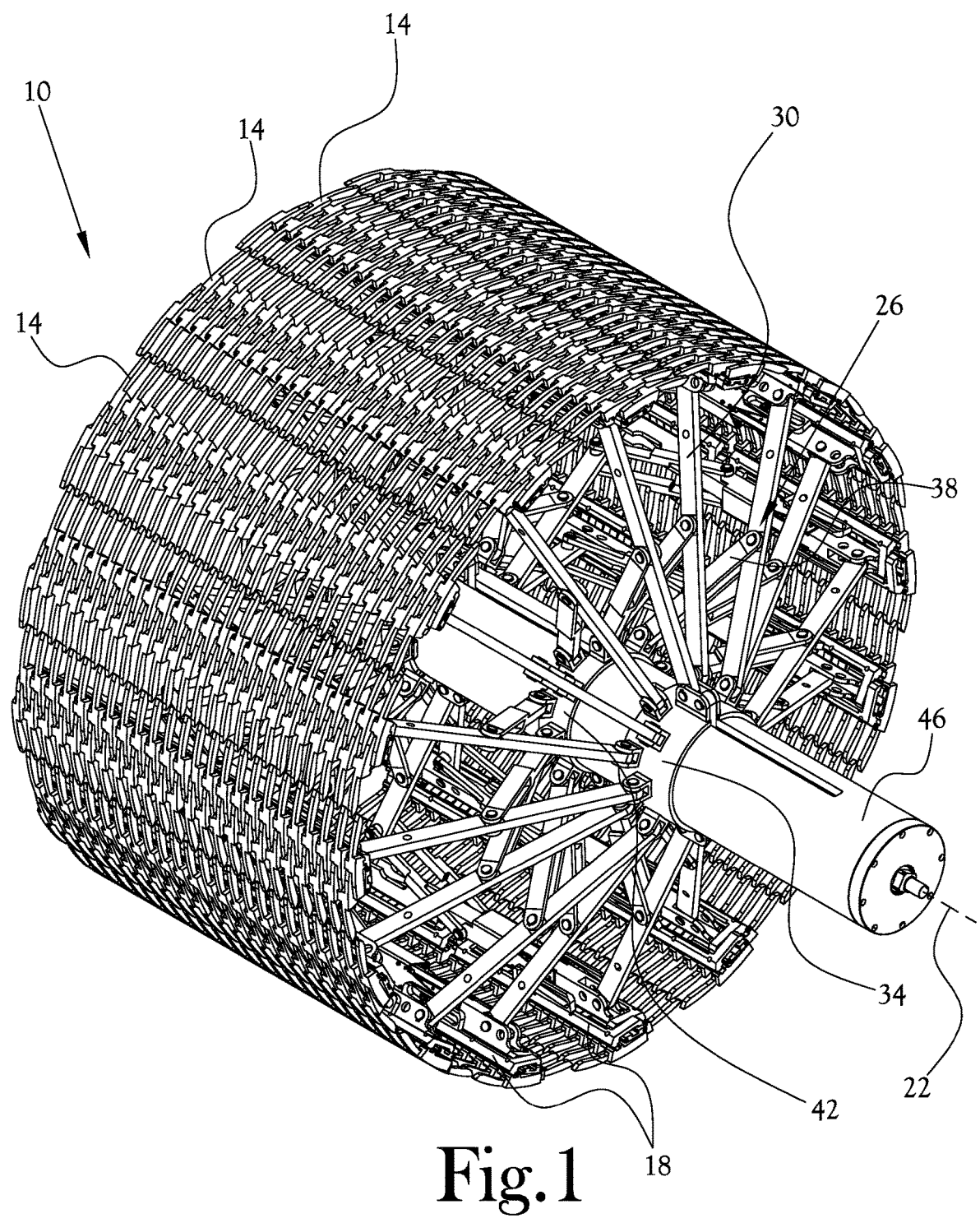
FIG. 1 illustrates a perspective view of an expanded tire drum having interlacing deck segments according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In the development of BT drums to improve performance and to alleviate or eliminate the aforementioned problems with the conventional technologies, there has been a desire for improved uniformity (for less run-out), which pointed to more sections, flexible elements, etc. Other trends have included narrower fingers (lighter, thinner material gauges), more range, little to no size changes, servo actuation-pulse movement, etc. Previous limitations on the diameter range of the BT drums included the disengagement of finger segments during expansion, not enough circumference, insufficient support from guide plates, telescoping rails, etc., and guide brackets for finger pivots running out of length. Additionally, there has been an industry interest in BT drums that exceed the previously discussed 1.7:1 diameter expansion ratio.

In example embodiments of the present general inventive concept, to achieve an expansion ratio of 2:1 or greater, arcuate outer circumferential segments that form a working surface of a tire building drum were developed with "finger" portions that interlace completely, which in some example embodiments is accomplished by eliminating, or substantially covering, the previously employed main segments, from which fingers extended in one or more directions, that formed portions of the deck surface. According to various example embodiments of the present general inventive concept, a tire building drum is provided with interlacing deck segments configured such that finger portions of the deck segments interlace and overlap a central support member, providing an increased deck support surface an expanded state of the tire drum. In some example embodiments, an expansion ratio in excess of 2:1 was achieved by interlacing the finger segments in more than a double arrangement. In the following descriptions of various example embodiments of the present general inventive concept, the deck segments may be referred to as interlacing deck segments, interlacing finger segments, finger deck segments, interlacing deck portions, deck forming segments, and so on. While the example embodiments described herein refer to tire building drums, it is understood that the present general inventive concept will also apply to radially expandable and contractible deck surfaces of the type used in manufacturing other types of materials and devices.

Various example embodiments of the present general inventive concept utilize a fourfold interlaced finger design to achieve a diameter ratio in excess of 2:1. The central support member (main segment) supporting the deck forming segments remains buried under the finger segments and may contain a pivot mounting for the finger segments on both sides of the central member. The finger segments are set opposed to each other, and crisscross over the central member. In various example embodiments, each finger segment may be machined, cast, forged, etc., as one or more pieces, joined together along the bottom by a section running the entire width of the segment. Although the pivoting portion is illustrated in some of the accompanying illustrations as running the entire width of the finger segments, such an arrangement may be partial width, or may not be present, in other example embodiments.

As will be shown in the accompanying illustrations of some example embodiments, when the deck is collapsed, the finger segments interlace in a fourfold arrangement. In other words, for at least a portion along the circumference of each segment, there will be four different finger elements composing the deck surface across its width at lower diameter settings. In one of the example embodiments, a BT drum configured according to the present general inventive concept delivered a diameter expansion ratio of 2.4:1.

Figure 2:
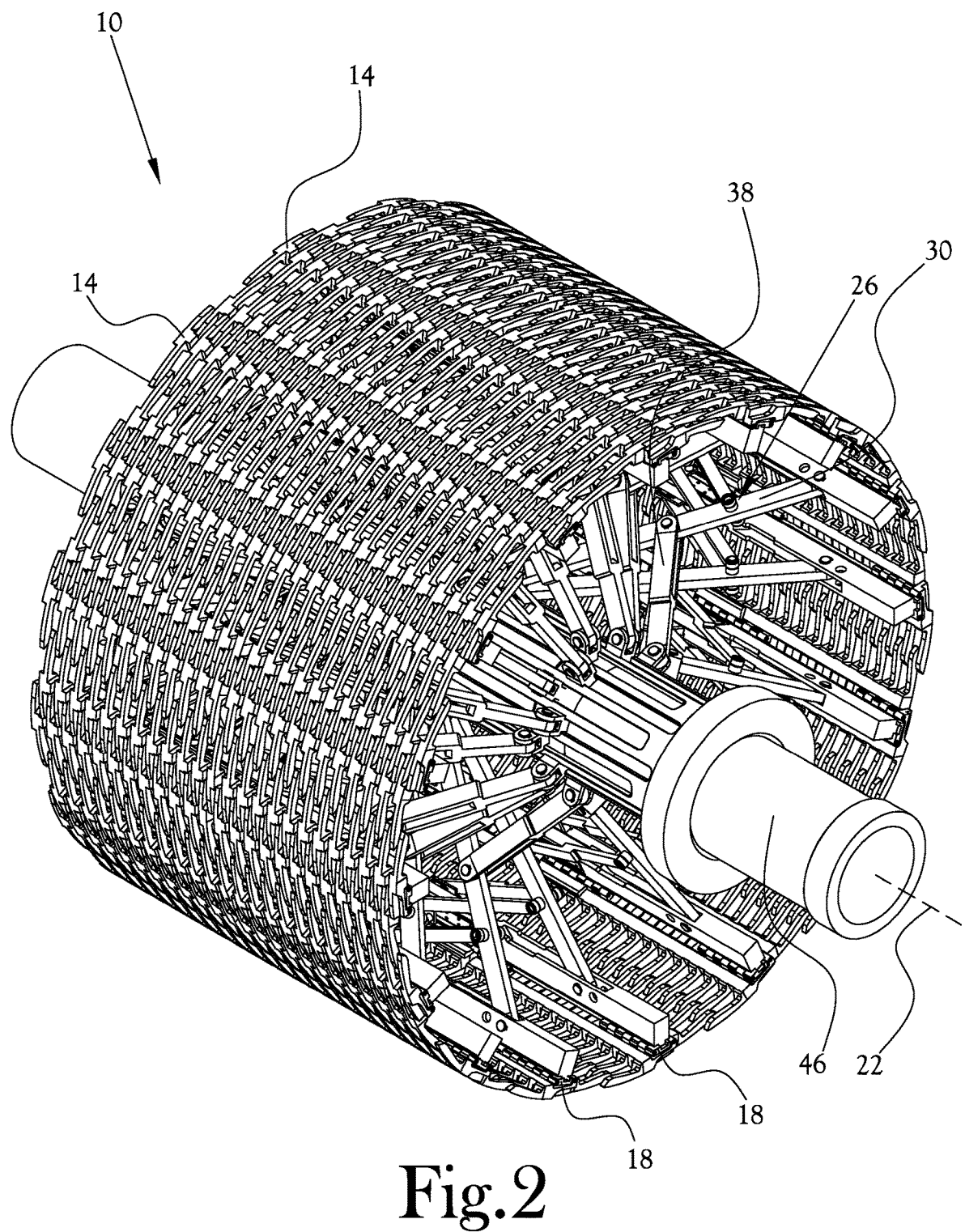
FIG. 2 illustrates another perspective view of the tire drum of FIG. 1 in a partially collapsed state.
Figure 3:
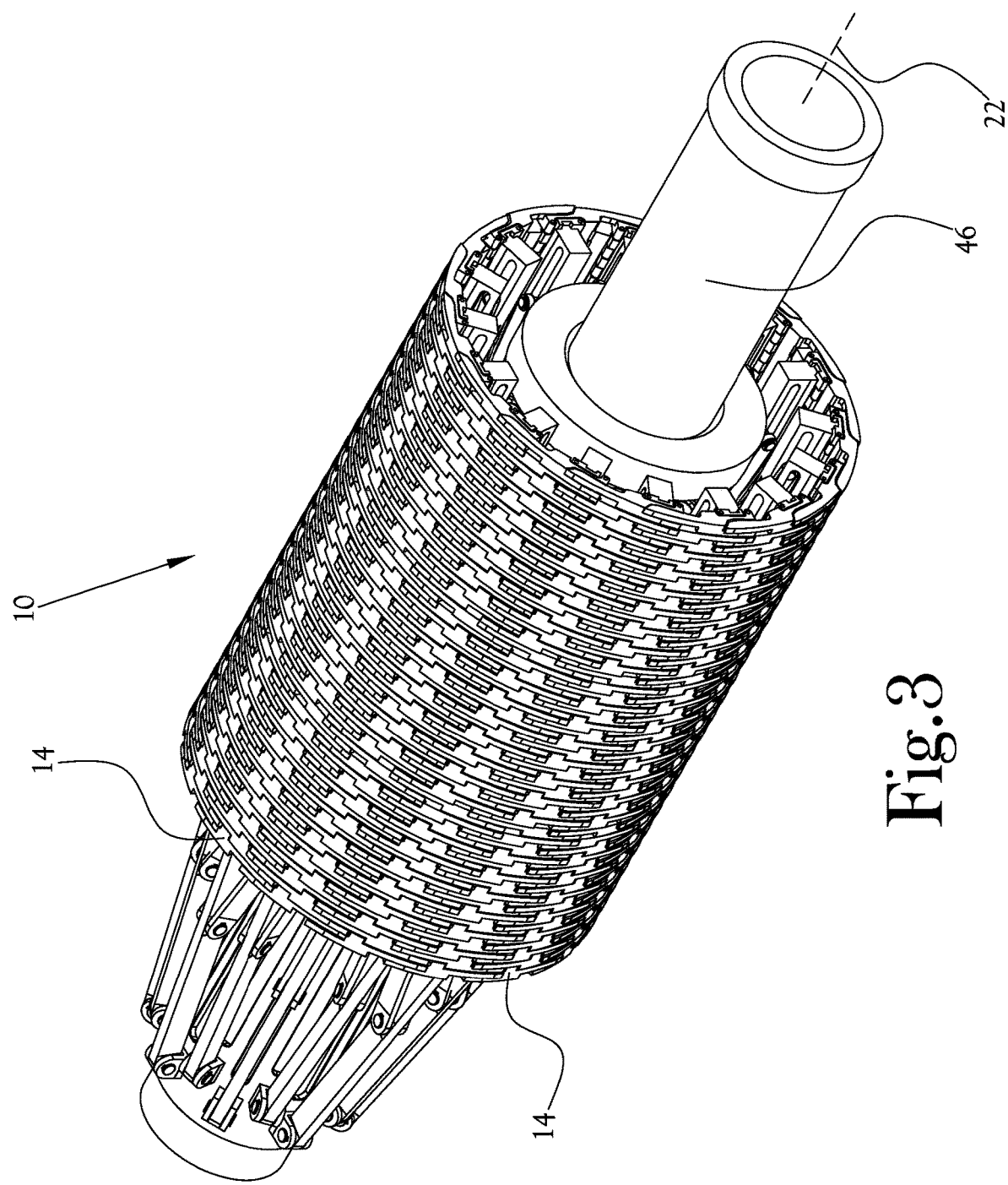
FIG. 3 illustrates a perspective view of the interlacing deck segments and linkage of the tire drum of FIG. 1 in a completely collapsed state.

FIG. 1 illustrates a perspective view of an expanded tire drum having interlacing deck segments according to an example embodiment of the present general inventive concept, FIG. 2 illustrates another perspective view of the tire drum of FIG. 1 in a partially collapsed state, and FIG. 3 illustrates a perspective view of the interlacing deck segments and linkage of the tire drum of FIG. 1 in a completely collapsed state. In the example embodiment illustrated in FIG. 1, an expanded belt and tread drum 10, or tire drum, defines generally an outer circumference comprising a plurality of arcuate interlacing deck segments 14, or finger segments, mounted on central support members 18 such that the interlacing deck segments 14 provide a supporting circumferential deck, or working surface, in various states of expansion of the tire drum 10, ranging from fully expanded to fully collapsed. The interlacing deck segments 14 are mounted such that they may be moved radially inward and outward toward and away from a centerline 22 of the tire drum 10. Thus, the outer working surface of the tire drum 10 is capable of expanding to various diameters to accommodate the construction of belt and tread packages for tires of different diameters. Therefore, when tires of various sizes need to be made on a given, or single, drum, the diameter of the circumference of the tire drum 10 may be adjusted accordingly. Additionally, the tire drum 10 is able to be collapsed from an expanded condition to permit the belt and tread package to be removed for transfer to a subsequent stage of the tire making process. As will be further discussed herein, each of the segments 14 of the drum 10 is formed with extending finger portions and open spaces or grooves that allow at least some of the finger portions to become interlaced and overlap the central support member 18 as the drum 10 approaches a collapses position.

As illustrated in FIGS. 1-3, in the tire drum 10 of this example embodiment of the present general inventive concept, each of the central support member 18 are coupled to at least one linkage assembly 26 that moves the central support members 18 radially toward and away from the centerline 22 of the tire drum 10. Each of the linkage assemblies 26 may have a first assembly portion 30 coupled to a corresponding central support member 18 at one end, and to a first assembly sliding portion 34 at the other end. Each of the linkage assemblies 26 may also have a second assembly portion 38 coupled to a corresponding first assembly portion 30 at one end, and to a second assembly sliding portion 42 at the other end. The first and second assembly sliding portions 34,42 may be configured to be slidable relative to a main shaft 46 of the tire drum 10, such that movement of the first and second assembly sliding portions 34,42 toward one another results in the central support members 18, and therefore the interlacing deck segments 14, being moved radially away from the centerline 22 of the tire drum 10, and such that movement of the first and second assembly sliding portions 34,42 away from one another results in the central support members 18, and therefore the interlacing deck segments 14, being moved radially toward the centerline 22 of the tire drum 10. The linkage assemblies 26 may be driven by any of a host of adjustment mechanisms. It is understood that a variety of other types of devices or assemblies may be used to move the central support members 18 and interlacing deck segments 14 in a radial direction toward and away from the centerline 22 of the tire drum 10, and therefore any further detailed discussion of the linkage and/or driving assemblies is omitted. A differently configured linkage system is shown in FIG. 2 simply to show one of many alternatives for driving the deck segments reciprocally in the radial direction.

While the structure and interactions of the interlacing deck segments 14 will be described in greater detail herein, FIG. 1 illustrates the general position of the segments 14 when the tire drum 10 is in a fully expanded position, wherein distal ends of finger portions of the segments 14 extending away from the central support members 18 still reach at least partially into the open spaces formed by the finger portions extending from the segment 14 mounted on an adjacent central support member 18. Such an extended "reach" is due to the configuration of the segments 14, in which the distal ends of those extending finger portions interlace with extending finger portions of neighboring segments 14 to overlap the corresponding central support members 18. This arrangement will be described in greater detail herein. As illustrated in FIG. 2, as the central support members 18 are moved closer to the main shaft 46 as the tire drum 10 is being collapsed, the distal ends of the extending finger portions of adjacent segments 14 extend further into the open spaces between the extending finger portions, and move into grooves formed in the adjacent segments 14 to become interlaced when the tire drum 10 is fully collapsed in FIG. 3. In FIG. 3, the linkage assemblies 26, central support members 18, and interlacing segments 14 are illustrated without much of the remaining portion of the tire drum 10 for the sake of clarity. Thus, as illustrated in FIG. 1, even at the fully expanded position there is at least some support across any surface of the tire drum 10 that is parallel with the longitudinal axis or centerline 22 of the tire drum 10. In other words, the extending finger portions of the segments 14 are configured such that there is at least some overlap at any point along the surface. As illustrated in FIGS. 2-3, as the drum 10 is collapsed the fingers of the finger segments 14 increasingly interlace until there are four different finger portions repeatedly interlacing in parallel fashion at some points along the drum at and near collapse. Thus, by overlapping the finger portions of the interlacing segments 14 over the central support members 18, even more expansion of the drum 10 is available without completely losing surface support. In various example embodiments of the present general inventive concept the interlacing deck segments 14 may be configured with two or more adjacent regions defining a radius of curvature which differs at least slightly from the radius of curvature of an adjacent region, such that the curvature of at least the outer surface of the segments 14 varies along the length of the fingers. Thus, a first region of the fingers may define an arcuate shape having a first radius of curvature corresponding to a first positional diameter of the deck surface, and a second region of the fingers may define an arcuate shape having a second radius of curvature corresponding to a second positional diameter of the deck surface.

Figure 4:
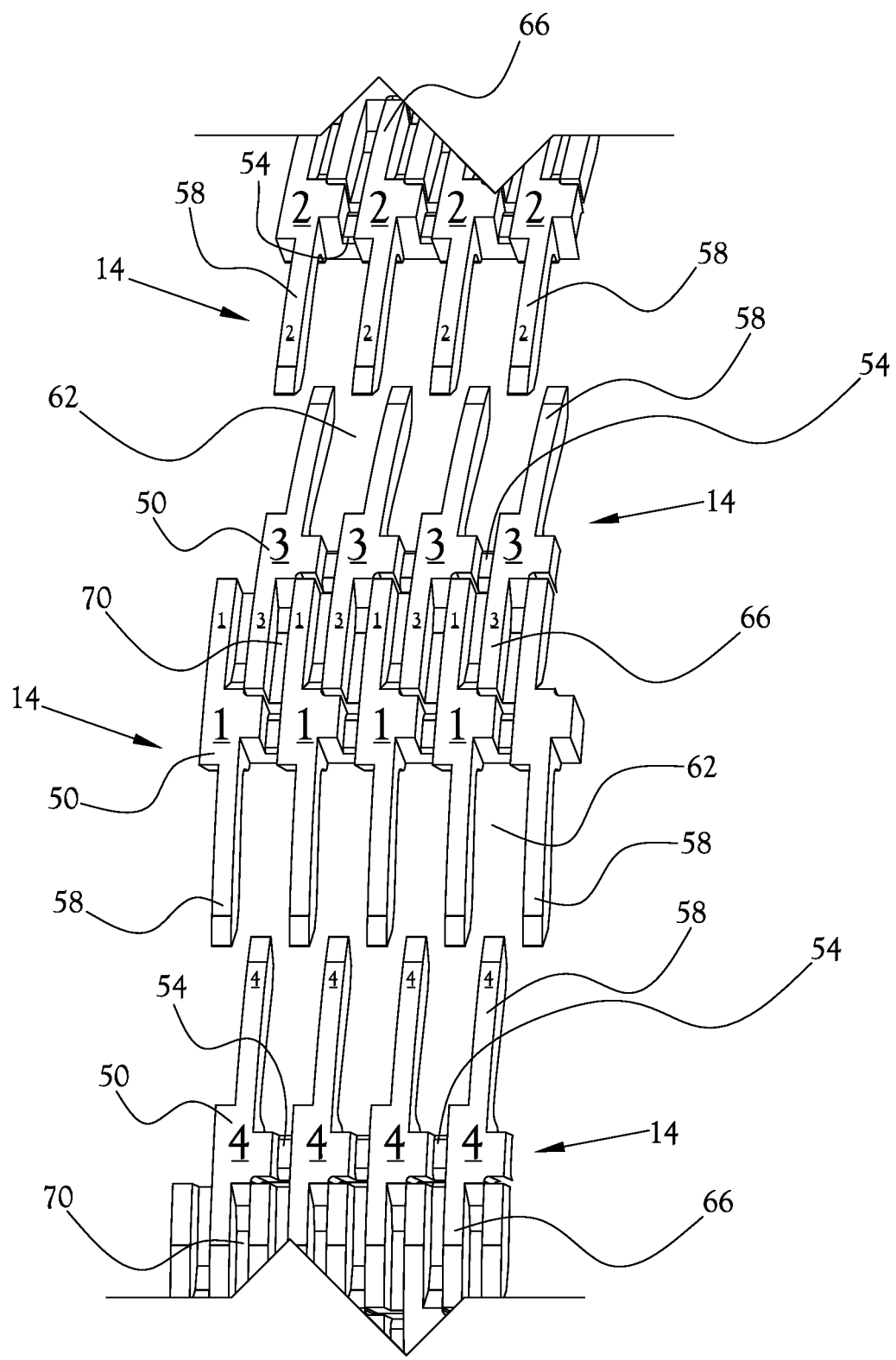
FIG. 4 illustrates an isolated perspective view of interlacing deck segments in an expanded state according to an example embodiment of the present general inventive concept.
Figure 5:
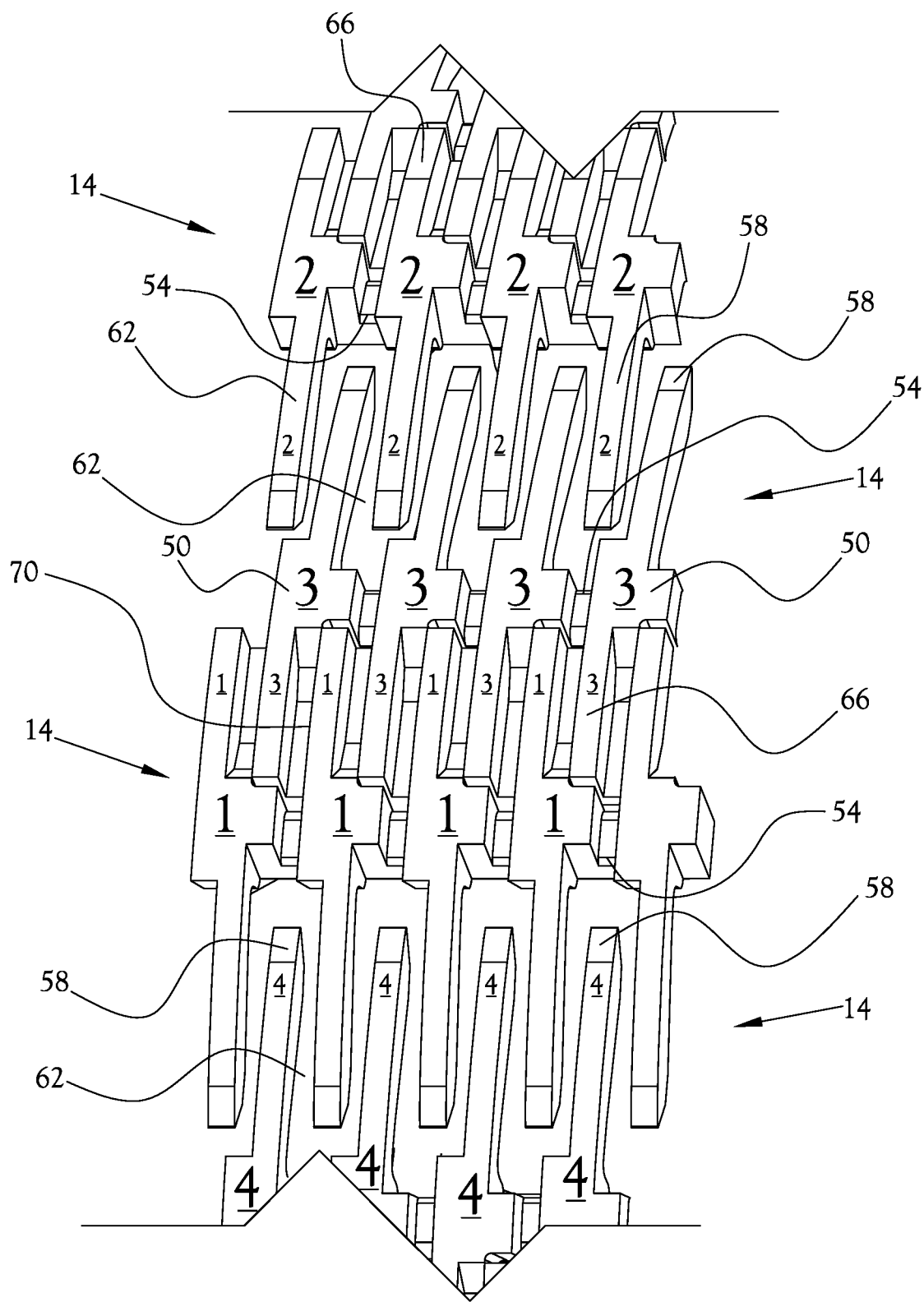
FIG. 5 illustrates an isolated perspective view of the interlacing deck segments of FIG. 4 in a partially collapsed state.
Figure 6:
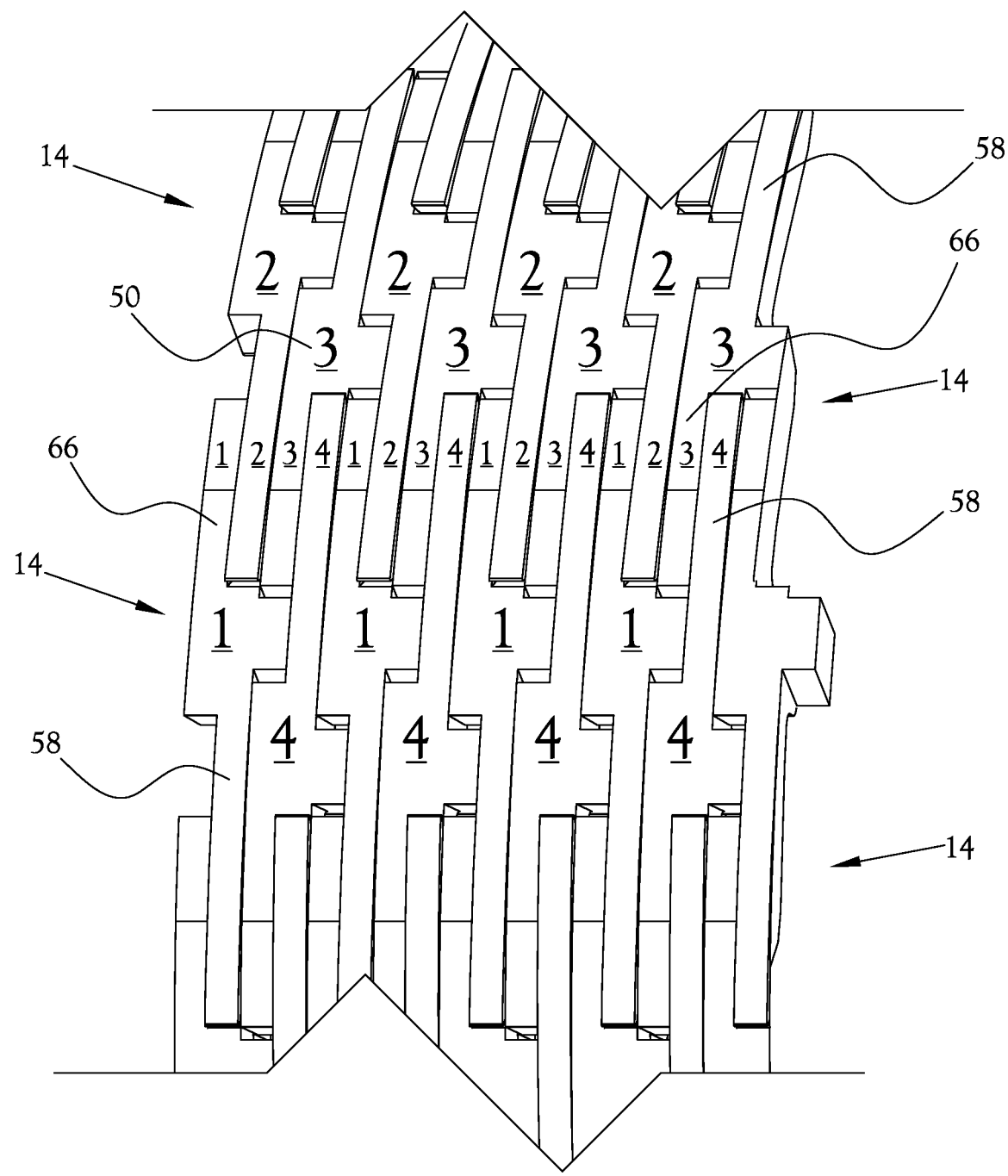
FIG. 6 illustrates an isolated perspective view of the interlacing deck segments of FIG. 4 in a completely collapsed state.

FIG. 4 illustrates an isolated perspective view of interlacing deck segments in an expanded state according to an example embodiment of the present general inventive concept, FIG. 5 illustrates an isolated perspective view of the interlacing deck segments of FIG. 4 in a partially collapsed state, and FIG. 6 illustrates an isolated perspective view of the interlacing deck segments of FIG. 4 in a completely collapsed state. It is understood that FIGS. 4-6 simply illustrate one example embodiment, and other arrangements in which finger segments are interlaced over a central support member may be employed without departing from the scope of the present general inventive concept. The interlacing deck segments 14 illustrated in FIGS. 4-6 are formed as single pieces, with four different deck segments 14 respectively labeled 1-4 at multiple locations to improve the ease of understanding regarding the arrangement of the finger and groove portions of the segments 14. The finger segments 14 marked as 1 and 3 are each coupled to one central support member 18, and the finger segments 14 marked 2 and 4 are respectively coupled to adjacent central support members 18 of the tire drum 10, with two such segments 14 coupled to each central support member 18 (not shown in FIGS. 5-6). However, it is understood that different finger segments could be individually formed and coupled to the central support member along the length thereof without departing from the scope of the present general inventive concept. As illustrated in FIGS. 4-6, each interlacing deck segment 14 includes a plurality of center sections 50 coupled together at a lower surface thereof such that a first groove 54 is formed between each pair of adjacent center sections 50. A plurality of first finger portions 58 extend respectively from each of the center sections 50, in a first direction away from the central support member to which the segment 14 is coupled, and form a plurality of open spaces 62 between each adjacent pair of the first finger portions 58. In various example embodiments the width of the first finger portions 58 may be one third that of the open spaces 62 between the first finger portions 58. A plurality of second finger portions 66 extend respectively from each of the center sections 50 in a second direction opposite to the first direction in which the first finger portions 58 extend. A plurality of second grooves 70 are respectively formed adjacent to each of the second finger portions 66. As illustrated in FIG. 4, if the first finger portions 58 are considered as extending from the "front" of the respective center sections 50, the second finger portions 66 are considered as extending from the "back" of the respective center sections 50. The fronts of the center sections 50 are formed unevenly so as to interact with corresponding fronts of center sections 50 of the segment 14 extending from an adjacent central support member 18. The second finger portions 66 extend from one edge of the respective backs of the center sections 50 such that the adjacent second grooves 70 extend respectively from approximately the middle of the back of the center sections.

Thus, the second finger portions 66 of each segment 14 provided on one central support member 18 remain in a parallel arrangement along with the second grooves 70 therebetween over the central support member 18. Also, the second grooves 70 are formed with an arcuate or otherwise contoured surface that slopes upward approaching the respective center sections 50, the arcuate or otherwise contoured surface corresponding to an arcuate or otherwise contoured surface of the ends of the first finger portions 58 such that the distal ends of the first finger portions 58 are raised as they slide through the second grooves 70 approaching the respective center sections 50. The width of the first finger portions 58 may be formed so as to correspond with the width of the first and/or second grooves 54,70 to provide a close guidance when moving therethrough. The segments 14 are rotatably coupled to the central support members 18 underneath, and therefore the segments 14 can at least slightly rotate to effect different arcuate degrees of circumference according to the expansion state of the tire drum 10. When the drum 10 is collapsing, the first finger portions 58 of one segment 14 are eventually guided into the first grooves 54 of another segment 14 extending from an adjacent center support member 18, and then further into the second grooves 70 of still another segment 14 as the drum 10 approaches full collapse. In various example embodiments the first grooves 54 may also be contoured begin raising the distal ends of the entering first finger portions 58.

As illustrated in FIG. 4, which shows the interlacing deck segments 14 in the approximate positions in which they would be when the tire drum 10 is at or near full expansion, the distal ends of the first finger portions 58 at least partially overlap to provide some surface support at the points between the central support members 18. In FIG. 5, as the drum 10 is partially collapsed, the first finger portions 58 extending from each of the segments 14 begin to further interlace as they approach the first finger portions 58 extending from a segment 14 on an adjacent central support member 18. As shown in FIG. 5, the distal ends of the first finger portions 58 of one segment 14 approach a position to enter the corresponding first grooves 54 of another segment 14 as the drum 10 further collapses. In FIG. 6 the tire drum 10 is in a completely collapsed state, and the finger portions 58,66 have become completely interlaced atop a portion of each of the central support members 18. As illustrated in FIG. 6, the first finger portions 58 extending from each of the closest segments 14 on adjacent central support members' 18 have been fully received through the corresponding first grooves 54 formed between the center sections 50 of one segment 14, and into the second grooves 70 formed between the second finger portions 66 of the other segment 14 on the subject central support member 18. In other words, taking the segments' 14 markings of 1-4 in FIGS. 4-6, the segments 14 marked "1" and "3" are provided on one central support member 18. The segment 14 marked "2" is arranged on one adjacent central support member 18 such that its first finger portions 58 extend in the same direction as the first finger portions 58 of the segment 14 marked "1", and the segment 14 marked "4" is arranged on another adjacent central support member 18 such that its first finger portions 58 extend in the same direction as the first finger portions 58 of the segment 14 marked "3". Thus, in the fully collapsed state of the tire drum 10 illustrated in FIG. 6, the first finger portions 58 of segment 14-"2" have traveled through the corresponding first grooves 54 of segment 14-"3" and into the corresponding second grooves 70 of segment 14-"1". Similarly, the first finger portions 58 of segment 14-"4" have traveled through the corresponding first grooves 54 of segment 14-"1" and into the corresponding second grooves 70 of segment 14-"3". With such an arrangement, the second finger portions 66 of each segment 14 mounted on one central support member 18, as well as the first finger portions 58 extending from each segment on the adjacent central support members 18 that extend toward the one central support member 18, all lie interlaced and in parallel over at least a portion of the central support member 18 located underneath. This interlacing arrangement over the central support member 18 allows for the extra length of the first finger portions 58 to be maintained in a substantially continuous surface when collapsed, while providing surface support at increased diameters when expanded.

Figure 7:
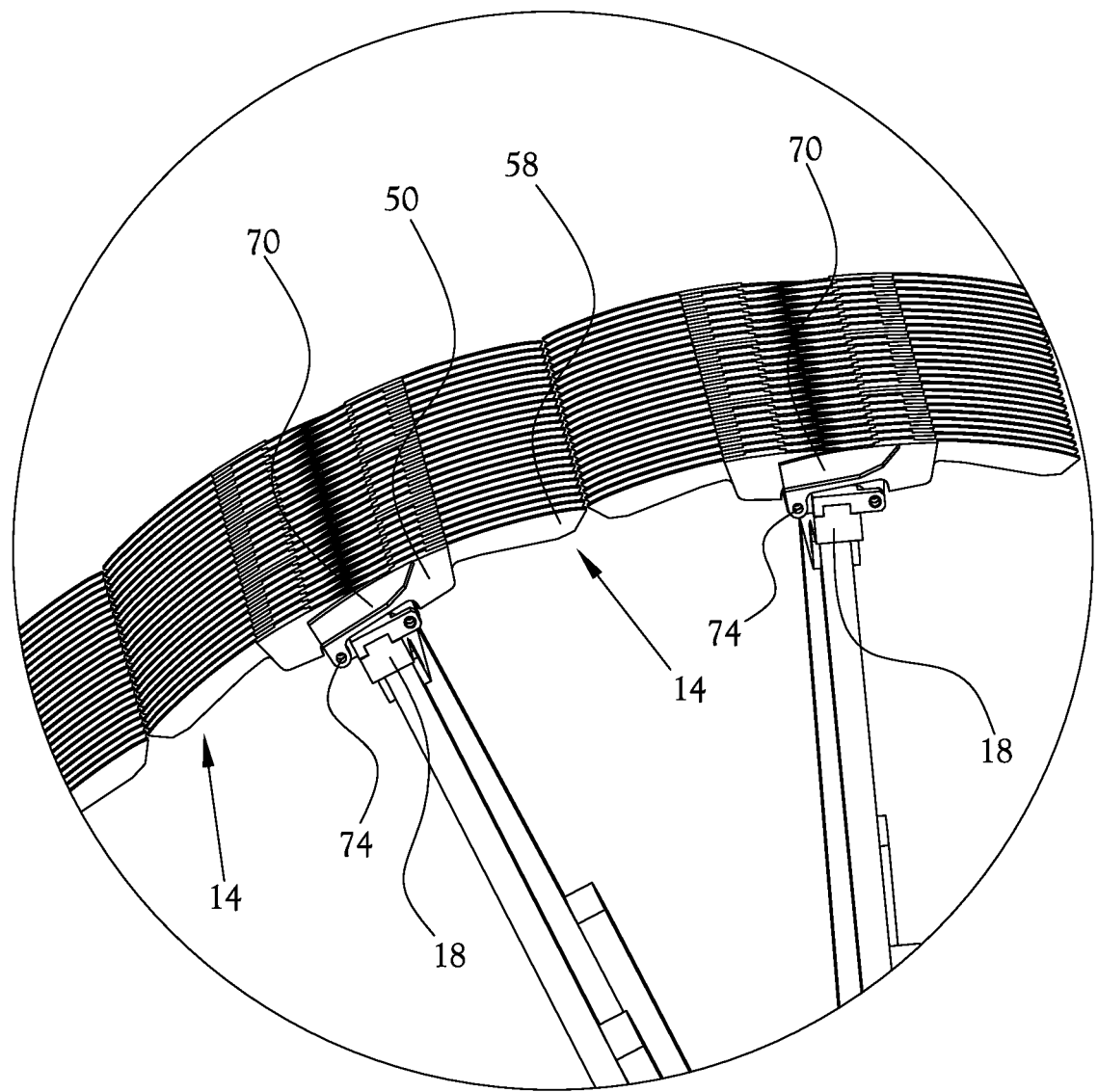
FIG. 7 illustrates another perspective view of a portion of an expanded tire drum having interlacing deck segments according to an example embodiment of the present general inventive concept.
Figure 8:
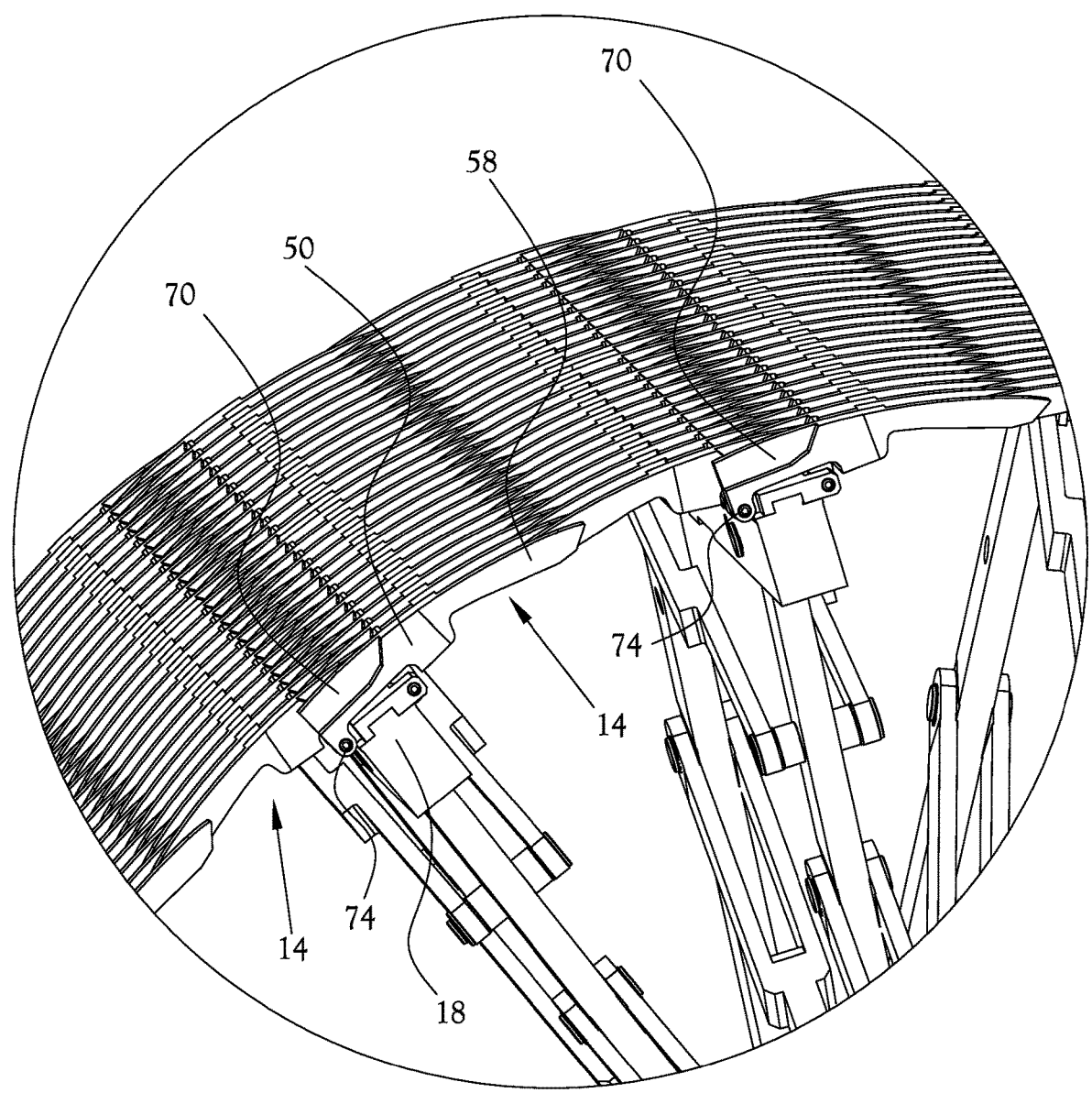
FIG. 8 illustrates the tire drum portion of FIG. 7 in a partially collapsed state.
Figure 9:
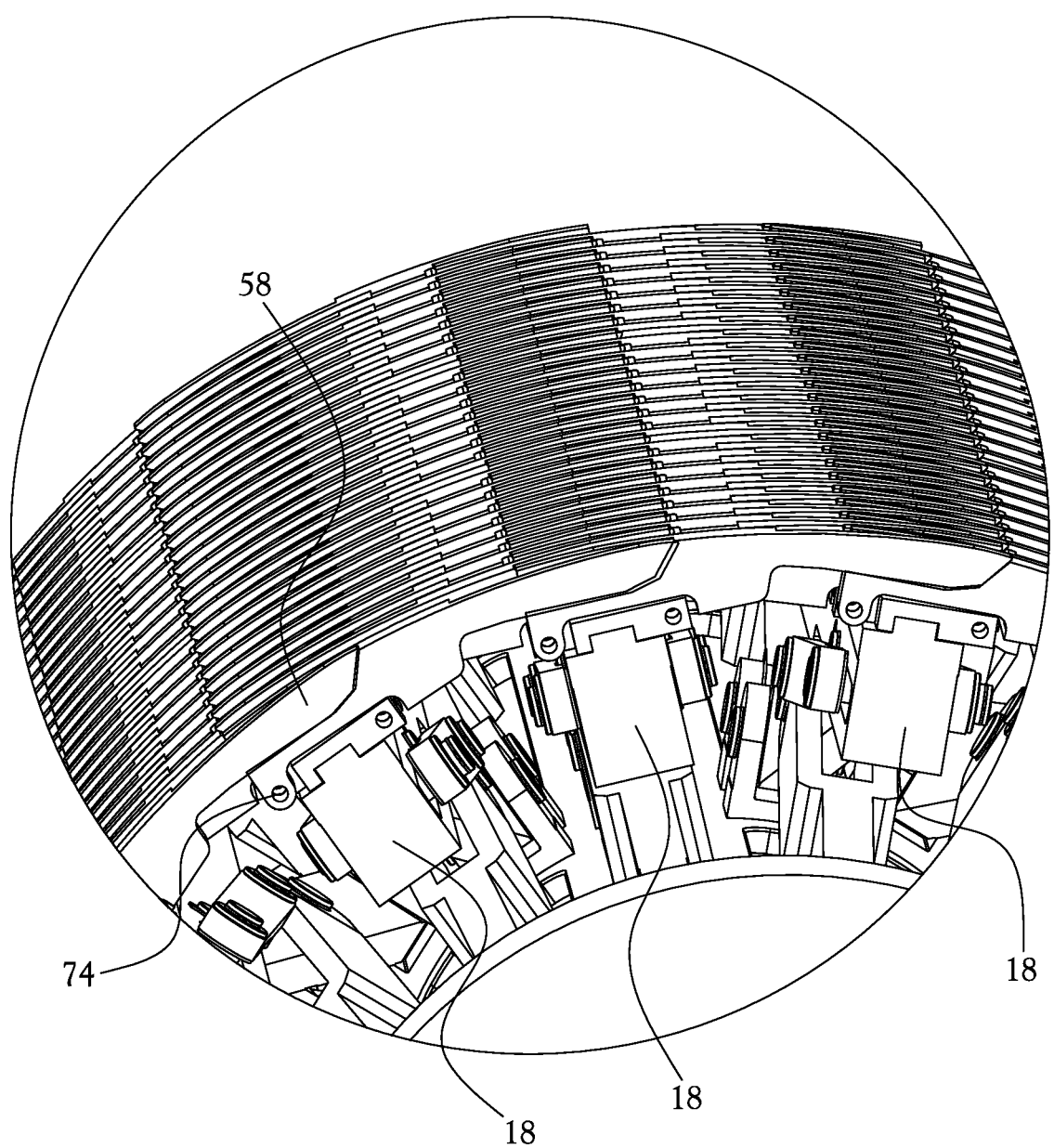
FIG. 9 illustrates the tire drum portion of FIG. 7 in a completely collapsed state.

FIG. 7 illustrates another perspective view of a portion of an expanded tire drum having interlacing deck segments according to an example embodiment of the present general inventive concept, FIG. 8 illustrates the tire drum portion of FIG. 7 in a partially collapsed state, and FIG. 9 illustrates the tire drum portion of FIG. 7 in a completely collapsed state. As illustrated in FIG. 7, a pair of interlacing deck segments 14 are coupled to each central support member 18, and arranged such that first finger portions 58 of one of the segments 14 extend away in a circumferential direction opposite to the first finger portions 58 of the other one of the segments 14 on the same central support member 18. In this example embodiment, the deck segments 14 are provided with a coupling opening 74 at an underside of the segment 14, at an end opposite to the distal ends of the first finger portions 58 of that segment 14. The coupling opening 74 may receive a pin or bolt or other such coupling member so as to be rotatably coupled to the central support member 18 underneath. In this example embodiment of the present general inventive concept, a bottom portion of the segment 14 rests atop a surface of the central support member 18, and the segment 14 can pivot about the coupling opening 74. Thus, when the first finger portions 58 begin to enter the first grooves 54 and second grooves 70 of other segments 14, the distal ends of those first finger portions 58 are able to be raised by the first and/or second grooves 54,70 as the segment 14 pivots about the coupling opening 74. In various example embodiments the bottom portion of the segment 14 can be formed to limit the downward pivoting of the segment 14 to a desired radius of curvature relative to the expansion state of the drum 10. A host of other coupling configurations can be utilized in different example embodiments of the present general inventive concept. For example, coupling openings may be provided to the central support member 18 rather than the segments 14, coupling members may be provided at the sides of the segments 14 or all along the length of the segments 14, and so on. The drawings included in this application may show an exaggerated position at the expanded state of the drum 10 simply to better illustrate the pivoting movement of the segments 14, and various example embodiments may provide a pivoting arrangement with an improved "roundness" at the fully expanded state. In FIG. 7 the segments are resting atop the central support members 18 in the drum's 10 fully expanded state. In FIG. 8 the distal ends of the first finger portions 58 of adjacent facing segments 14 are becoming more overlapped as the first finger portions 58 enter the open spaces 62 between the first finger portions 58 of the adjacent facing segment 14. In FIG. 9 the drum 10 has been fully collapsed, and the distal ends of the first finger portions have passed through the first grooves 54 of the facing adjacent segment 14, and on into the second grooves 70 of the segment 14 on the other side of the facing adjacent segment 14.

Figure 10:
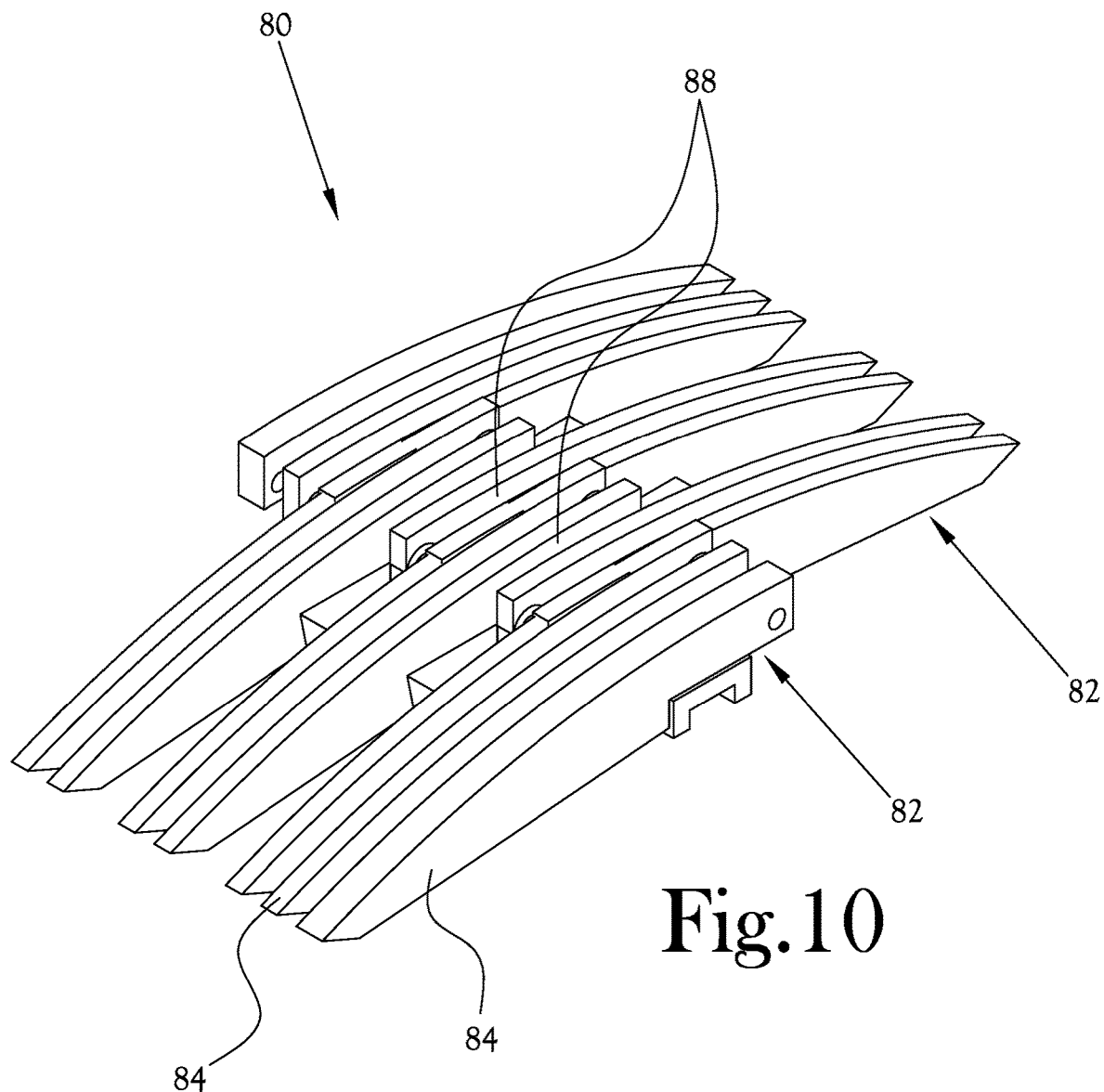
FIG. 10 illustrates a perspective view of an interlacing deck segment according to another example embodiment of the present general inventive concept.
Figure 11:
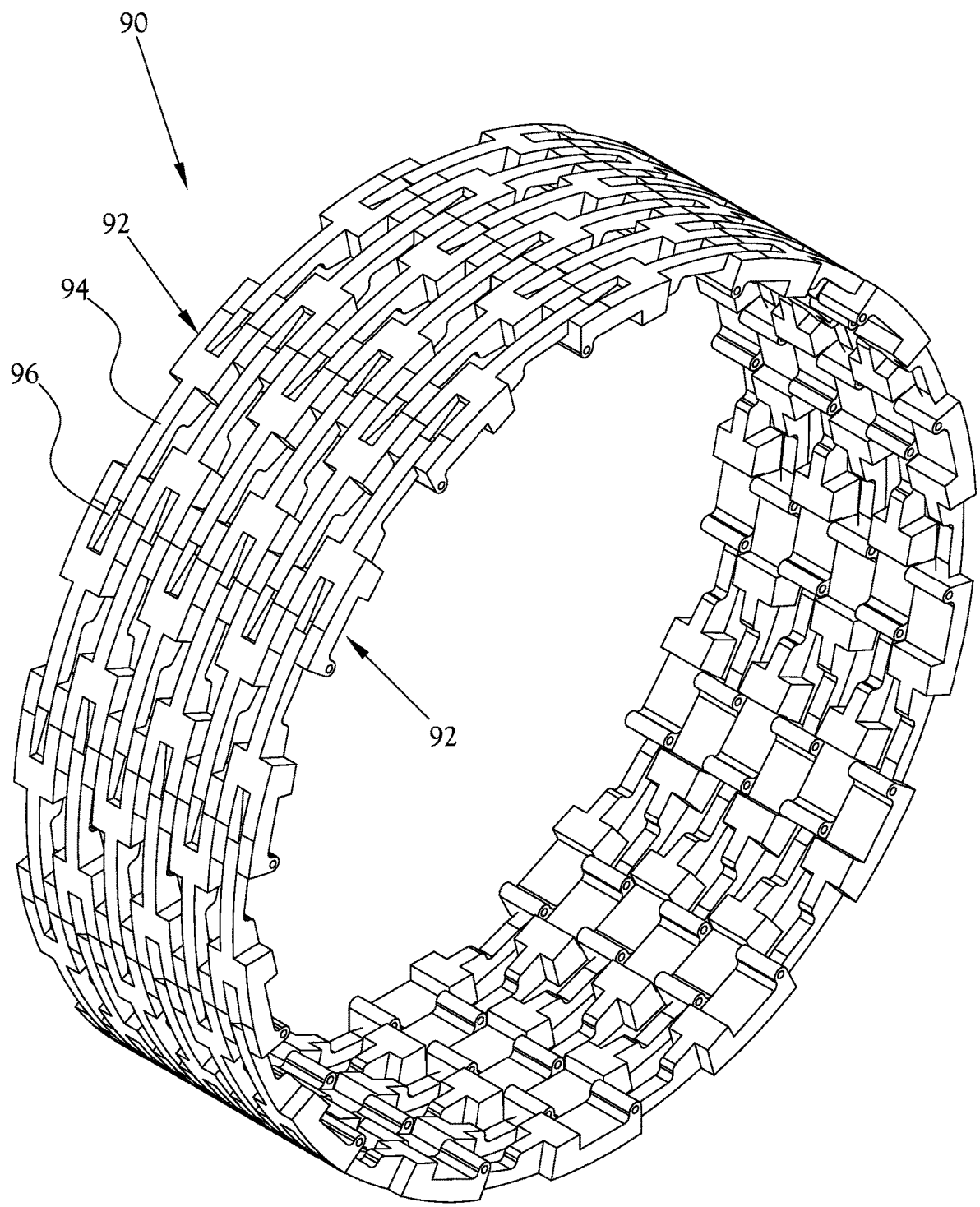
FIG. 11 illustrates a perspective view of interlacing deck segments according to yet another example embodiment of the present general inventive concept.
Figure 12:
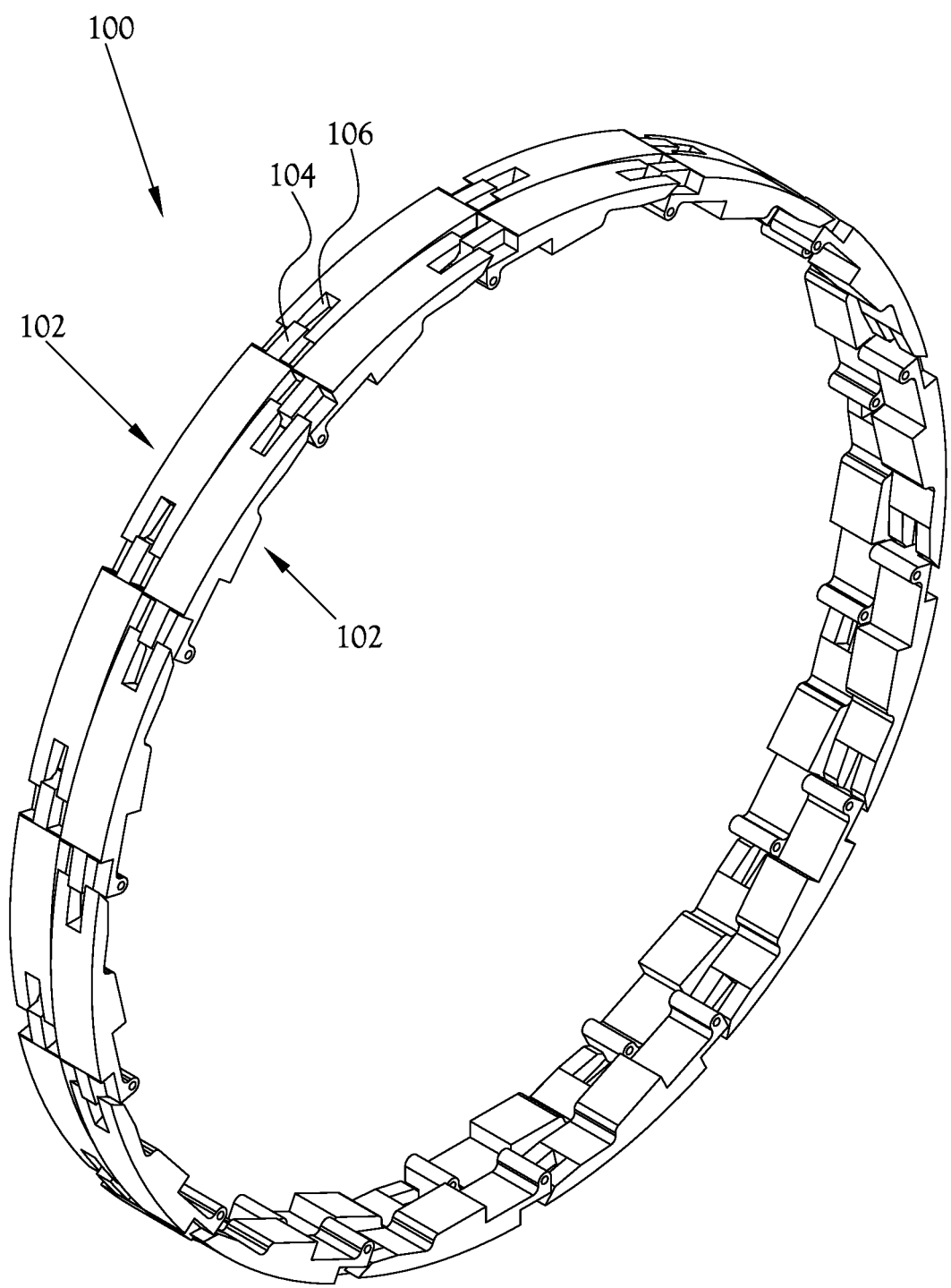
FIG. 12 illustrates a perspective view of interlacing deck segments according to still another example embodiment of the present general inventive concept.

FIG. 10 illustrates a perspective view of an interlacing deck segment according to another example embodiment of the present general inventive concept. In the example embodiment illustrated in FIG. 10, a tire drum assembly 80 may include first and second interlacing deck segments 82 provided on a central support member and having fingers 84 that extend away from the central support member and form grooves 88 between proximal ends of the finger 84 and over the central support member to accept distal ends of fingers 84 from adjacent central support members when the tire building drum is in a collapsed state. FIG. 11 illustrates a perspective view of interlacing deck segments according to yet another example embodiment of the present general inventive concept. In the example embodiment illustrated in FIG. 11, a tire drum 90 may include first and second interlacing deck segments 92 provided on each central support member, and having fingers 94 that extend away from the central support member and into a groove 96 formed over the central support member when the tire building drum 90 is in a collapsed state. FIG. 12 illustrates a perspective view of interlacing deck segments according to still another example embodiment of the present general inventive concept. In the example embodiment illustrated in FIG. 12, a tire building drum 100 may include first and second support members 102 provided on each central support member, and having fingers 104 that extend away from the central support member and into a groove 106 formed over the central support member when the tire building drum 100 is in a collapsed state.

Figure 13:
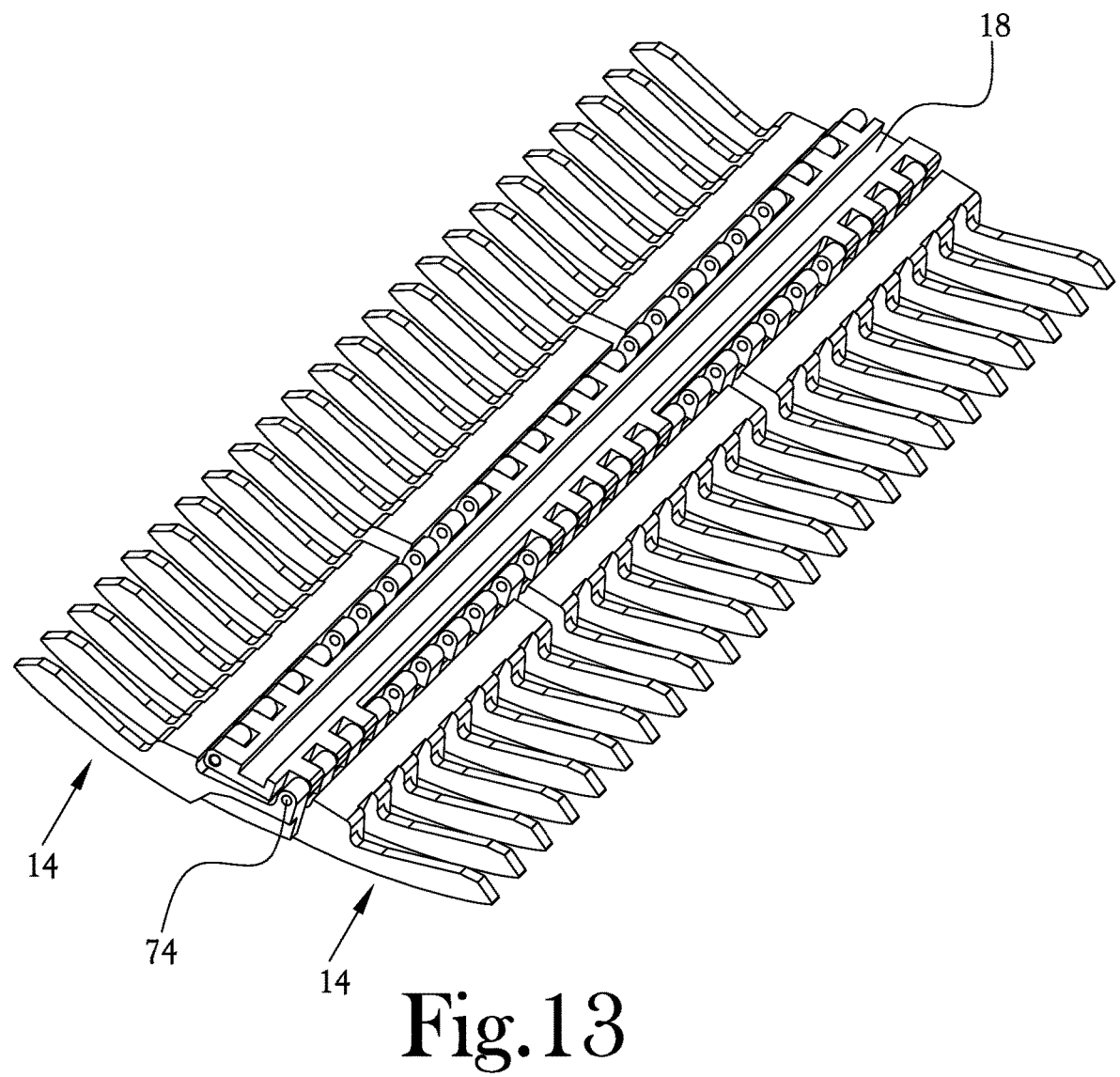
FIG. 13 illustrates a perspective view of an underside of a portion of the tire building drum of FIG. 1.

FIG. 13 illustrates a perspective view of an underside of a portion of the tire building drum of FIG. 1. As illustrated in FIG. 13, each of the interlacing deck segments 14 is coupled to the central support member 18 by a coupling opening on a side of the central support member 18 opposite the side from which the first finger portions of the segments 14 extend.

In various example embodiments of the present general inventive concept, to achieve such a large diameter range, a Scott Russell linkage is utilized in two places under each central member. These can be offset from neighboring sections for clearance purposes. In some embodiments this would set atop a main shaft with an internal screw for precise servo control, but other common mounting and actuation methods, such as push-pull, would also be possible. To further support the central members, the use of tangent bars may be incorporated on one or both ends, or in-between. In an example embodiment, each finger segment may pivot throughout the diameter range in order to optimize run-out (deviation from true circle). It is understood that the Scott Russell linkage is merely one type of expansion and collapse mechanism that may be used with the interlacing deck segments, and a host of other devices or assemblies may be employed without departing from the scope of the present general inventive concept. More traditional guide brackets incorporating a curved slot to guide a dowel attached to a neighboring finger segment may also be used. In other example embodiments, one or more additional links may be added to the traditional linkage. This may provide a secondary means of actuation intended to slide axially with the central member. As such, connections from this "shuttle" to the underside of the finger segments comprised of helical slots and cam followers, for example, would control the relationship between the deck's diameter growth and the finger pivot angle. In other example embodiments, a spherical connection to the underneath side of the finger segment could also accomplish this, but may present more side load.

Thus, various example embodiments of the present general inventive concept may provide such benefits as, for example, diameter expansion ratios in excess of 2:1, zero size changes or adjustments, no completely unsupported areas (as the fingers may always be at least somewhat engaged), and so on.

Various example embodiments of the present general inventive concept may provide an assembly defining a portion of an arcuate outer circumferential working surface of a tire building drum, the assembly including first and second interlacing deck segments coupled to a central support member that is configured to be moved in a radially reciprocating manner from a longitudinal axis of the tire building drum, wherein each of the first and second interlacing deck segments includes a plurality of center sections coupled together proximate a lower surface thereof, a plurality of first grooves respectively formed between the center sections, a plurality of first finger portions extending respectively from the center sections away from the central support member, a plurality of second finger portions extending respectively from the center sections in an opposite direction from the first set of fingers and over the central support member, and a plurality of second grooves formed adjacent each of the respective second finger portions, wherein the second finger portions from each of the first and second interlacing deck segments are arranged in a substantially parallel formation over the central support member, and wherein the first grooves in each of the first and second interlacing deck segments respectively align with the second grooves of the other of the first and second interlacing deck segments. The first and second finger portions may be arranged such that first finger portions from facing interlacing deck segments on adjacent central support members are received in the second grooves between the parallelly arranged second finger portions when the tire building drum is in a collapsed state. The second finger portions of each of the first and second interlacing deck segments may be arranged parallelly with the first finger portions from the facing interlacing deck segments on the adjacent central support members when the tire building drum is in the collapsed state. The first grooves may have a first bottom support surface formed by connecting portions between the center sections, the first bottom support surface being configured to guide the first finger portions from the adjacent interlacing deck segments to the second grooves formed between the second finger portions when the tire building drum is being collapsed. The second grooves may have a bottom surface that is contoured upward such that distal ends of the first finger portions are raised while sliding through the second grooves. The distal ends of the first finger portions may have contoured bottom surfaces to register with the bottom surfaces of the second grooves. The first grooves may have a bottom surface that is contoured upward so as to guide the distal ends of the first finger portions upward and toward the second grooves. The distal ends of the first finger portions may have a partially tapered upper surface so as to approximate a level of a top surface of the center sections when the tire building drum is in a collapsed state. The first and second interlacing deck segments may be respectively pivotally coupled to the central support member proximate ends opposite distal ends of the first finger portions. The first interlacing deck segment may be pivotally coupled to an edge of the central support member opposite the first finger portions of the first interlacing deck segment, and the second interlacing deck segment may be pivotally coupled to an edge of the central support member opposite the first finger portions of the second interlacing deck segment. A portion of a bottom surface of the first and second interlacing deck segments proximate the pivotal couplings may lie atop a surface of the central support member when the first finger portions are not supported in the first or second grooves. A range of movement of the distal ends of the first finger portions may be controlled by a shape of the portion of the bottom surface of the first and second interlacing deck segments.

Various example embodiments of the present general inventive concept may provide an assembly defining a portion of an arcuate outer circumferential working surface of a tire building drum, the assembly including a central support member, a first interlacing deck segment coupled to the central support member, and configured with a first plurality of finger portions extending in a first circumferential direction away from the central support member, a second interlacing deck segment coupled to the central support member, and configured with a second plurality of finger portions extending in a second circumferential direction away from the central support member and opposite to the first circumferential direction, and a plurality of parallel grooves formed over the central support member proximate end portions of the first and second interlacing deck segments opposite distal ends of the finger portions, wherein first and second interlacing deck segments are configured such that finger portions extending from adjacent central support members are received in an parallel and interlaced configuration covering the central support member when the tire building drum is in a collapsed state. The distal ends of finger portions extending toward one another may at least partially overlap in a longitudinal direction of the tire building drum when the tire building drum is in a fully expanded state. The first and second interlacing deck segments may be pivotally coupled to the central support member such that distal ends of the finger portions are raised when entering corresponding grooves over adjacent central support members.

Various example embodiments of the present general inventive concept may provide a segment defining a portion of an arcuate outer circumferential working surface of a tire building drum, the segment including first and second finger segments coupled to a central support member configured to be moved in a radially reciprocating manner from a longitudinal axis of the tire building drum, wherein each of the first and second finger segments include a plurality of center sections coupled together proximate a lower surface thereof, a plurality of center section grooves respectively provided between the center sections, a first set of fingers extending respectively from the center sections away from the central support member, and a second set of fingers extending respectively from the center sections in an opposite direction from the first set of fingers and over the central support member, wherein the second sets of fingers from each of the first and second finger segments are arranged in a substantially parallel formation over the central support member, and wherein the center section grooves in each of the first and second finger segments extend between the parallelly arranged second sets of fingers. The first and second finger segments may be arranged such that first sets of fingers from adjacent segments are received in the center section grooves between the parallelly arranged second sets of fingers when the tire building drum is in a collapsed state. The second sets of fingers may be arranged parallelly with the first sets of fingers from the adjacent segments when the tire building drum is in the collapsed state. The center section grooves may have a bottom support surface formed by connecting portions between the center sections and by an arcuate extension from each of the center sections, the bottom support surface potentially being configured to guide the first sets of fingers from the adjacent segments between the second sets of fingers when the tire drum is being collapsed. The first and second finger segments may be pivotally coupled to the central support member proximate distal ends of the second set of fingers.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. An assembly defining a portion of an arcuate outer circumferential working surface of a tire building drum, the assembly comprising:
    first and second interlacing deck segments coupled to a central support member that is configured to be moved in a radially reciprocating manner from a longitudinal axis of the tire building drum;
    wherein each of the first and second interlacing deck segments comprise:
        a plurality of center sections coupled together proximate a lower surface thereof,
        a plurality of first grooves respectively formed between the center sections,
        a plurality of first finger portions extending respectively from the center sections away from the central support member,
        a plurality of second finger portions extending respectively from the center sections in an opposite direction from the first finger portions and over the central support member, and a plurality of second grooves formed adjacent each of the respective second finger portions, wherein the second finger portions from each of the first and second interlacing deck segments are arranged in a substantially parallel formation over the central support member, and wherein the first grooves in each of the first and second interlacing deck segments respectively align with the second grooves of the other of the first and second interlacing deck segments.

2. The assembly of claim 1, wherein the first finger portions are sized and shaped for receipt in the second grooves between the second finger portions.

3. The assembly of claim 2, wherein the first and second finger portions extend parallel with one another along a circumferential dimension of the arcuate outer circumferential working surface.

4. The assembly of claim 2, wherein the first grooves have a first bottom support surface formed by connecting portions between the center sections.

5. The assembly of claim 2, wherein the second grooves have a bottom surface that is contoured upward such that distal ends of the first finger portions are raised while sliding through the second grooves.

6. The assembly of claim 5, wherein the distal ends of the first finger portions have contoured bottom surfaces to register with the bottom surfaces of the second grooves.

7. The assembly of claim 5, wherein the first grooves have a bottom surface that is contoured upward so as to guide the distal ends of the first finger portions upward and toward the second grooves.

8. The assembly of claim 5, wherein the distal ends of the first finger portions have a partially tapered upper surface.

9. The assembly of claim 1, wherein the first and second interlacing deck segments are respectively pivotally coupled to the central support member.

10. The assembly of claim 9, wherein the first interlacing deck segment is pivotally coupled to an edge of the central support member opposite the first finger portions of the first interlacing deck segment, and wherein the second interlacing deck segment is pivotally coupled to an edge of the central support member opposite the first finger portions of the second interlacing deck segment.

11. The assembly of claim 10, where a portion of a bottom surface of the first and second interlacing deck segments proximate the pivotal couplings lies atop a surface of the central support member when the first finger portions are not supported in the first or second grooves.

12. The assembly of claim 11, wherein a range of movement of the distal ends of the first finger portions is controlled by a shape of the portion of the bottom surface of the first and second interlacing deck segments.

* * * * *